United States Patent
Dean et al.

(10) Patent No.: US 11,858,559 B2
(45) Date of Patent: Jan. 2, 2024

(54) CARGO COMPONENT OF VEHICLE

(71) Applicant: Ford Global Technologies, LLC, Dearborn, MI (US)

(72) Inventors: William Henry Dean, Plymouth, MI (US); George David Aucott, Novi, MI (US); AmirReza Latif, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 17/511,428

(22) Filed: Oct. 26, 2021

(65) Prior Publication Data

US 2023/0126542 A1   Apr. 27, 2023

(51) Int. Cl.
*B62D 33/02* (2006.01)
*B60R 13/01* (2006.01)

(52) U.S. Cl.
CPC ........ *B62D 33/02* (2013.01); *B60R 2013/016* (2013.01); *B60Y 2200/11* (2013.01); *B60Y 2200/141* (2013.01)

(58) Field of Classification Search
CPC . B60P 3/14; B62D 33/02; B60R 13/01; B60R 2013/016; B60Y 2200/11; B60Y 2200/141
USPC ............................................. 296/39.2, 183.1
See application file for complete search history.

(56) References Cited

U.S. PATENT DOCUMENTS

| | | | | |
|---|---|---|---|---|
| 5,556,151 A | * | 9/1996 | New | B60R 13/01 269/902 |
| 5,597,193 A | * | 1/1997 | Conner | B60P 7/14 410/112 |
| 5,788,310 A | * | 8/1998 | McKee | B60R 13/01 410/80 |
| 6,224,127 B1 | | 5/2001 | Hodge | |
| 7,059,647 B1 | * | 6/2006 | Sierakowski | B60R 13/01 296/37.6 |
| 7,862,269 B2 | | 1/2011 | Kovie | |
| 8,123,283 B2 | | 2/2012 | Edwards et al. | |
| 9,168,874 B2 | * | 10/2015 | Smith | B60R 9/00 |
| 9,387,806 B2 | * | 7/2016 | Bzoza | B60R 5/041 |
| 9,527,454 B2 | * | 12/2016 | Smith | B60R 9/06 |
| 9,956,924 B2 | * | 5/2018 | Nania | F24C 15/322 |
| 10,889,223 B2 | * | 1/2021 | Pascarella | B62D 33/0273 |
| 10,988,087 B2 | * | 4/2021 | Smith | B60R 11/06 |
| 11,433,952 B2 | * | 9/2022 | Smolik | B60P 3/14 |
| 2001/0042985 A1 | * | 11/2001 | Hodge | B60P 3/14 296/26.08 |
| 2008/0298923 A1 | * | 12/2008 | Kovie | B60P 3/14 410/94 |
| 2010/0206666 A1 | * | 8/2010 | Jeeves | B60P 3/14 182/150 |
| 2017/0136958 A1 | * | 5/2017 | Smith | B60R 11/06 |

OTHER PUBLICATIONS

Atiyeh, 8 Unique Features on the 2021 Ford F-150, Forbes Wheels, 12 pages, Sep. 30, 2020.

* cited by examiner

*Primary Examiner* — Jason S Morrow
(74) *Attorney, Agent, or Firm* — Burris Law, PLLC

(57) ABSTRACT

A cargo component of a vehicle includes a panel, at least one ridge, and a plurality of measurement gradations. The ridge extends along the panel. The plurality of measurement gradations are formed in and along the ridge. In one form, the ridge extends in a longitudinal direction of the panel.

18 Claims, 8 Drawing Sheets

CARGO COMPONENT OF VEHICLE

FIELD

The present disclosure relates to a cargo component of a vehicle and a vehicle having a cargo component.

BACKGROUND

The statements in this section merely provide background information related to the present disclosure and may not constitute prior art.

Conventional vehicles such as pick-up trucks, for example, include a cargo area that is used for storing and transporting cargo such as 2×4s, piping, tubing and other materials from a storage facility to a job site or dwelling. It is often preferable to measure and/or cut the cargo as it is removed from the cargo area. However, measuring devices for measuring the cargo may be left at the job site, for example, and therefore not located near the vehicle, which requires additional trips back and forth from the job site to the vehicle.

These issues related to measuring cargo on a job site, among other issues related to the cargo area, are addressed by the present disclosure.

SUMMARY

This section provides a general summary of the disclosure and is not a comprehensive disclosure of its full scope or all of its features.

In one form, the present disclosure provides a cargo component of a vehicle that includes a panel, at least one ridge, and a plurality of measurement gradations. The ridge extends along the panel. The measurement gradations are formed in and along the ridge.

In variations of the cargo component of the above paragraph, which may be implemented individually or in any combination: the panel is a floor panel, and the ridge is integral with and extends above the floor panel; the ridge is configured to provide stiffness to the panel; the ridge extends in a longitudinal direction of the panel, and each measurement gradation extends in a lateral direction relative to the at least one ridge; the measurement gradations are grooves formed in the at least one ridge; a measurement grid is formed on the panel; the ridge includes opposing sides, and at least one of the opposing sides is straight; the ridge extends substantially a length of the panel; a bead is formed in the panel and positioned a predetermined distance from a nearest measurement gradation of the plurality of measurement gradations, the bead is configured to act as an end point for measuring cargo located along the at least one ridge; the bead is T-shaped; the bead is configured to provide stiffness to the panel; a floor mat is located on the panel, the floor mat comprising a decorative structure configured to measure angles of objects located thereon; the measurement gradations are longitudinally aligned with each other.

In another form, the present disclosure provides a cargo component of a vehicle that includes a panel, plurality of longitudinal ridges, and a plurality of measurement gradations. The plurality of ridges extend along the panel and are configured to provide stiffness to the panel. The measurement gradations are formed in and along each ridge of the longitudinal ridges.

In yet another form, the present disclosure provides a cargo component of a vehicle that includes a floor, at least one longitudinal ridge, a plurality of measurement gradations, and a bead. The longitudinal ridge extends along the panel and is configured to provide stiffness to the floor. The longitudinal ridge is integral with and extends above the floor. The plurality of measurement gradations are formed in and along the longitudinal ridge. The bead is formed in the floor and is positioned a predetermined distance from a nearest measurement gradation of the plurality of measurement gradations of the longitudinal ridge. The bead is configured to act as an end point for measuring cargo located along the at least one longitudinal ridge.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 2:
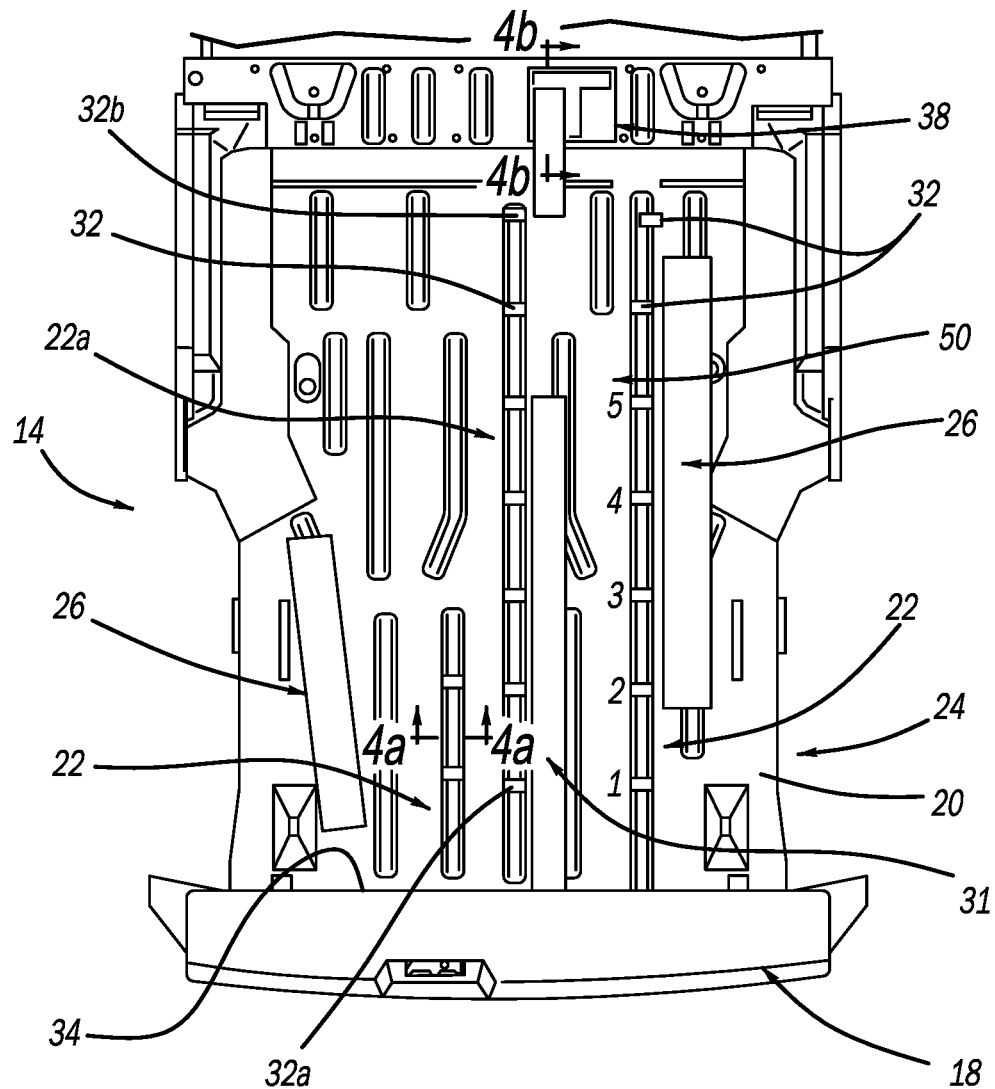
FIG. 2 is a top view of the cargo bed of FIG. 1.
Figure 4A:
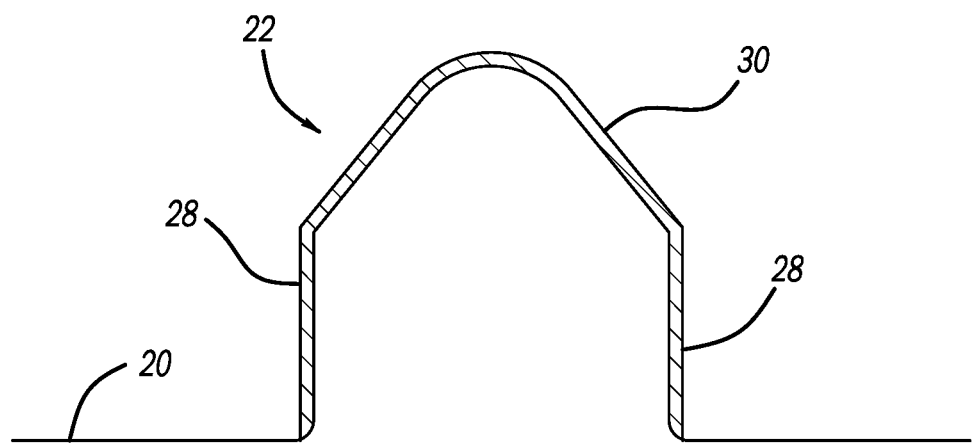
Figure 4B:
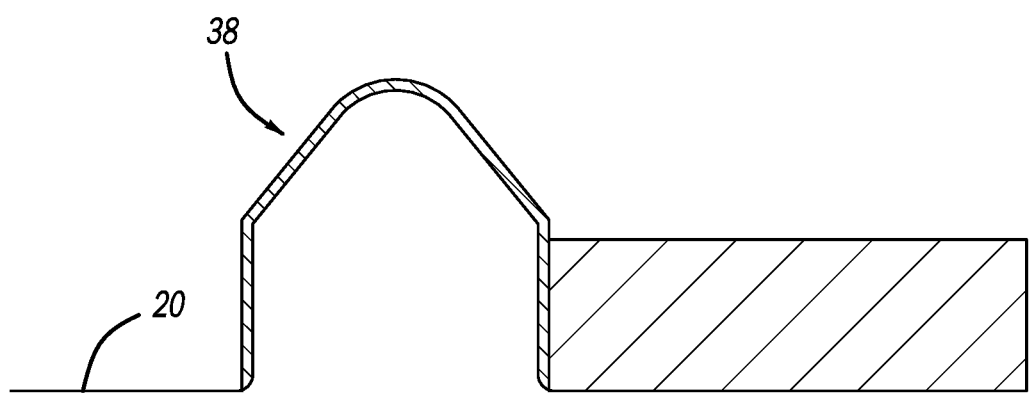
Figure 5:
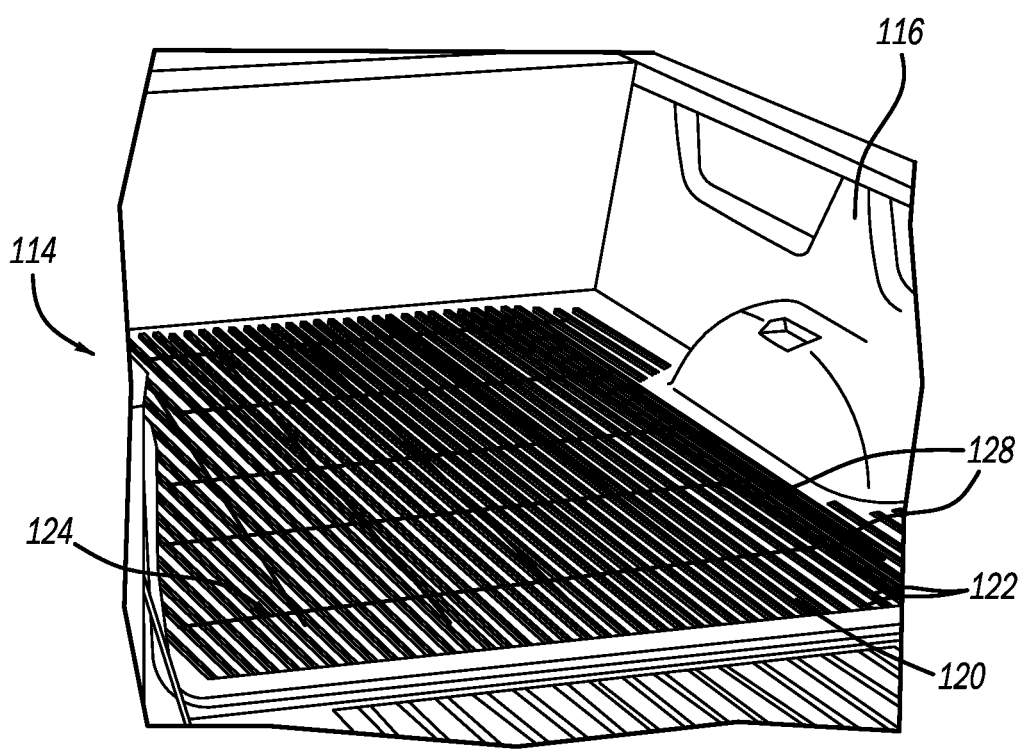
Figure 6:
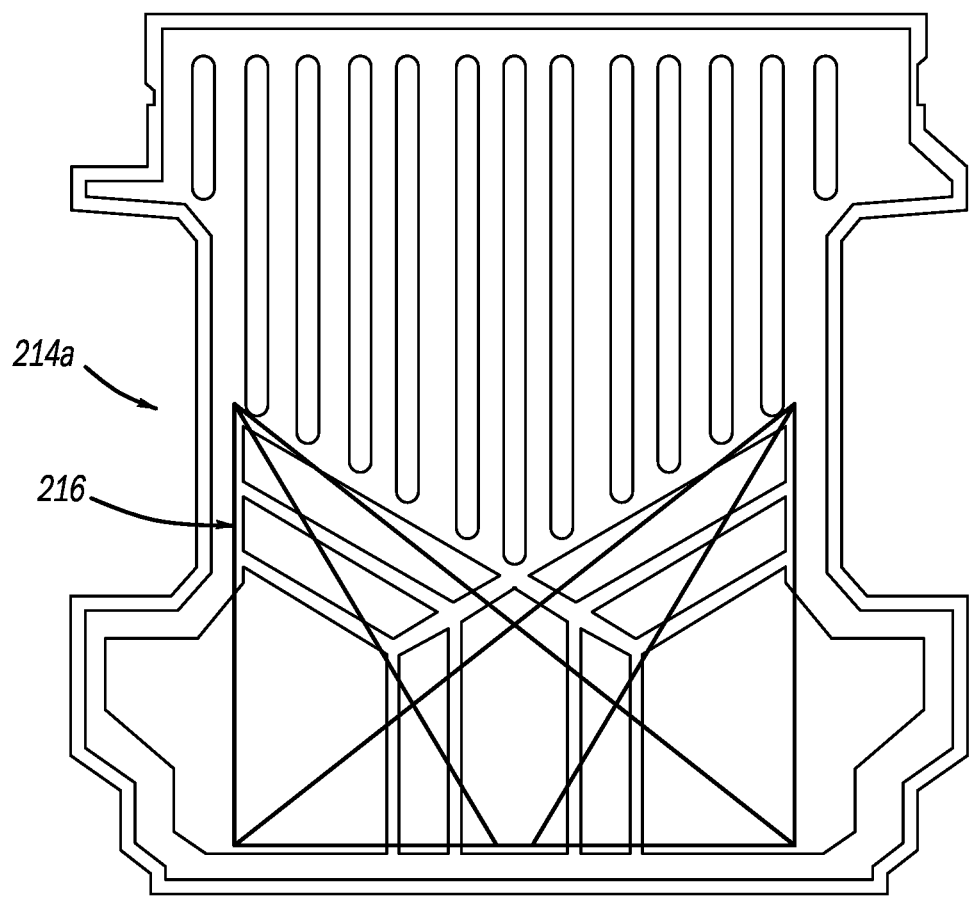
Figure 7:
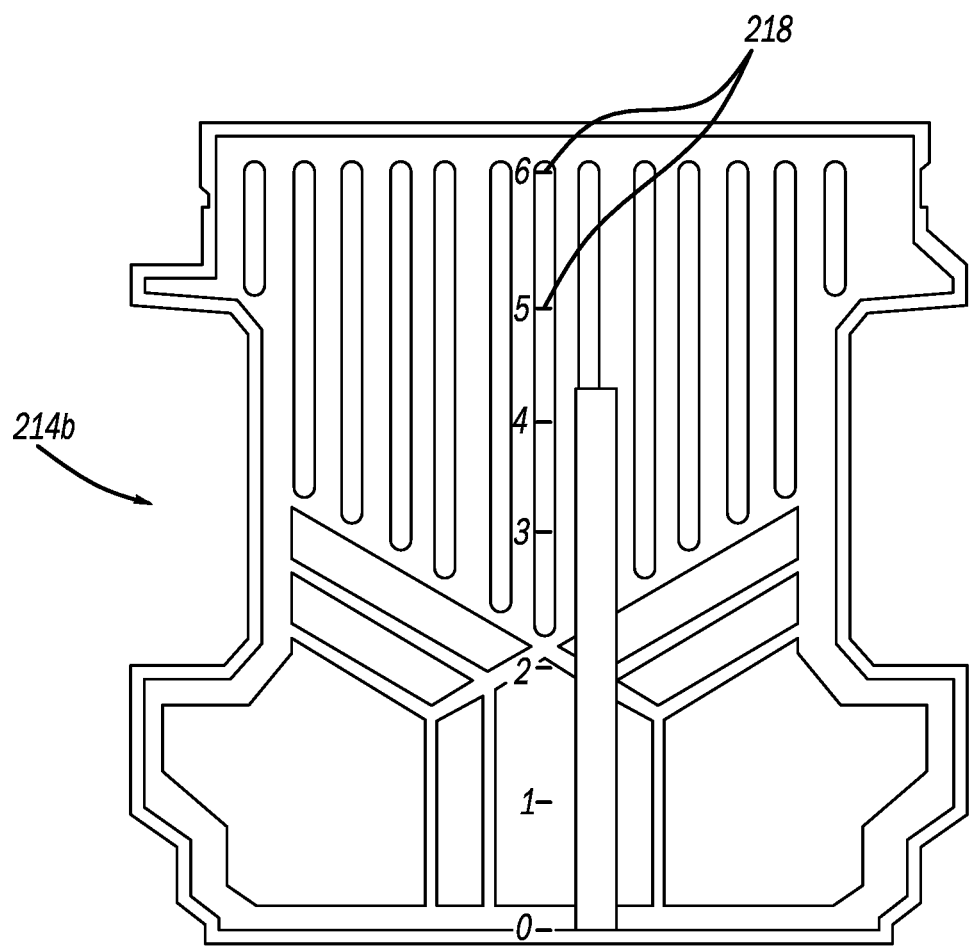

FIG. 4*a* is a cross-sectional view of the cargo bed along line 4*a*-4*a* of FIG. 2;

FIG. 4*b* is a cross-sectional view of the cargo bed along line 4*b*-4*b* of FIG. 2;

FIG. 5 is a perspective view of another cargo bed according to the principles of the present disclosure;

FIG. 6 is a top view of a floor mat according to the principles of the present disclosure; and FIG. 7 is a top view of another floor mat according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
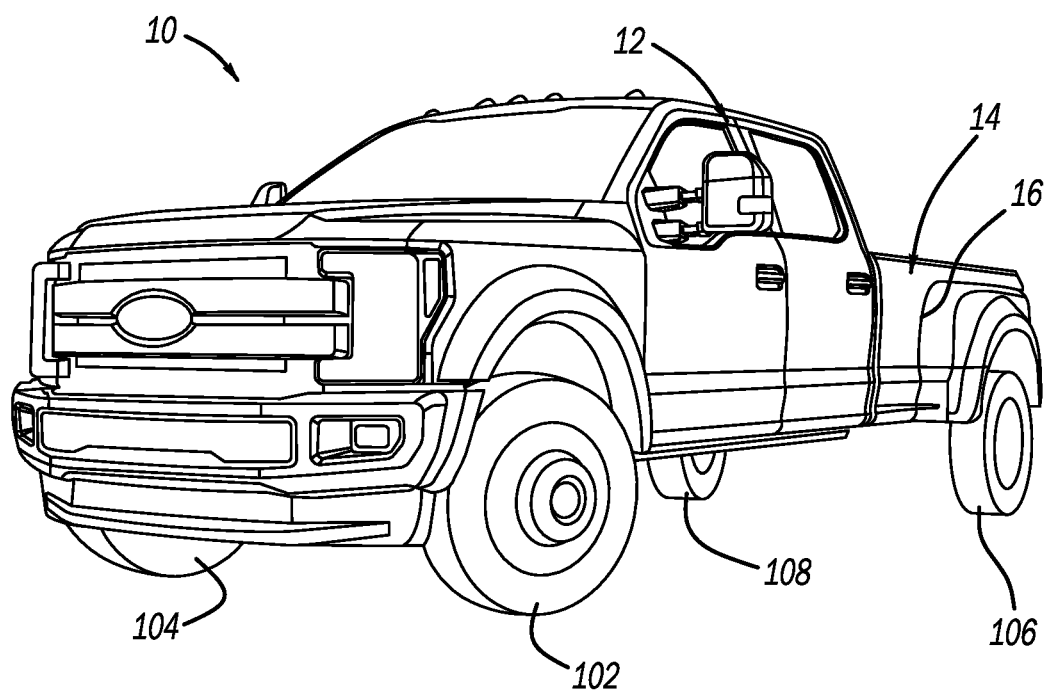
FIG. 1 is a perspective of a vehicle including a cargo bed according to the principles of the present disclosure.

With reference to FIGS. 1 and 2, a vehicle 10 such as a pick-up truck, for example, is illustrated. The vehicle 10 includes a cab 12, a plurality of wheels 102, 104, 106, 108, and a cargo bed or component 14. The cargo bed 14 extends from the cab 12 and includes a plurality of side walls 16, a tailgate 18, a panel, which in this form is a floor panel or bottom surface 20, and a plurality of ridges 22. The plurality of side walls 16 extend from an aft end of the cab 12. The tailgate 18 is coupled to the side walls 16 and is pivotable about a horizontal axis (not shown) between a closed position and an open position. When the tailgate 18 is in the closed position, the tailgate 18 cooperates with the side walls 16 to define a partially enclosed cargo compartment 24. When the tailgate 18 is in the open position, the side walls 16 define an opening to the cargo compartment 24. Cargo 26 such as 2×4s, piping, tubing and other materials to be transported from a facility to a jobsite or dwelling, for example, may be stored and transported in the cargo compartment 24. In some forms, the vehicle 10 may be a cargo van (not shown), among other types of vehicles, by way of example.

Figure 3:
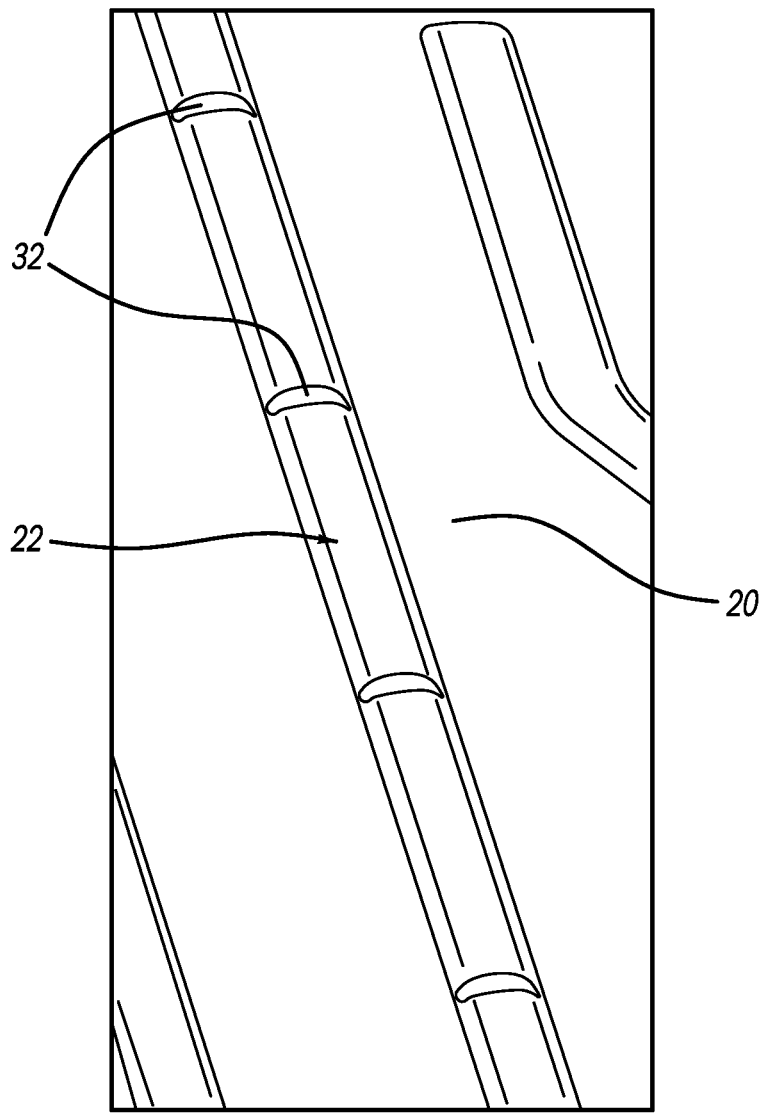
FIG. 3 is an enlarged perspective view of one longitudinal extending ridge of the cargo bed of FIG. 2 having measurement gradations formed therein.

With additional reference to FIGS. 3 and 4a, in the example illustrated, the ridges 22 extend in a longitudinal direction relative to a length of the floor panel 20. In another example, one or more of the ridges 22 may extend in a lateral direction (not shown) relative to the length of the floor panel 20. In yet another example, one or more of the ridges 22 extend at an oblique angle relative to the length of the floor panel 20. The ridges 22 are configured to provide rigidity to the floor panel 20. In one form, the ridges 22 are stamped into the floor panel 20 of the cargo bed 14. In the example illustrated, one or more of the ridges 22 extend substantially an entire length of the floor panel 20, two or more of the ridges 22 are spaced apart laterally from each other, and two or more of the ridges 22 are spaced apart longitudinally from each other. In the example illustrated, the ridges 22 are integral with and extend above the floor panel 20. In another example, the ridges 22 may be formed as depressions in the floor panel 20 and therefore extend below the floor panel 20 rather than extending above the floor panel 20 as illustrated herein. As shown in FIG. 4a, each ridge 22 includes opposing sides 28 and an upper profile surface 30. In one form, the opposing sides 28 of one or more of the ridges 22 are straight, or perpendicular/normal to the floor panel 20, and the upper profile surface 30 is arcuate and convex as shown. In some forms, the upper profile surface 30 may be flat, concave, or any other suitable shape without departing from the scope of the present disclosure.

A plurality of measurement gradations 32 are formed in and along one or more ridges 22 of the plurality of ridges 22. The plurality of measurement gradations 32 are configured to facilitate quick and accurate measurement of cargo 26 located on the floor panel 20 of the cargo compartment 24. For example, the measurement gradations 32 are spaced apart from each other along a respective ridge 22 in predetermined increments such that when cargo 26 is positioned along the respective ridge 22, the cargo 26 can be quickly and accurately measured. In the example illustrated, the measurement gradations 32 of ridge 22a are spaced one (1) foot, or twelve (12) inches, apart. In this way, a user can quickly and accurately determine that a plank 31 (e.g., 2×4) positioned along the ridge 22a is approximately five (5) feet long without the need for additional/separate measuring devices. The measurement gradations 32 also assist the user in quickly being able to cut cargo located on the floor panel 20 of the cargo bed 14 to a predetermined dimension without the need for additional measuring devices (e.g., a tape measure). The opposing sides 28 of the ridge 22 being straight also facilitates alignment and cutting of the cargo especially when the cargo includes bends (e.g., flexible piping). It should be understood that different ridges 22 may include measurement gradations 32 that are spaced apart from each other in different predetermined increments. For example, the measurement gradations 32 of ridge 22a are spaced one (1) foot apart while the measurement gradations 32 of another ridge 22 may be spaced one-half a foot (six (6) inches) apart. In this way, accurate and efficient measurement of different sized cargo can be provided for.

In one example, when the tailgate 18 is in the closed position, the tailgate 18 is used as a starting point for measuring cargo located along the ridge 22 in the cargo compartment 24. That is, in the example illustrated, an inner surface 34 of the tailgate 18 is used as the starting point for measuring the plank 31 located along the ridge 22a (i.e., the plank 31 is five (5) feet as measured from the inner surface of the tailgate 18). In this example, the inner surface 34 of the tailgate 18 is located one (1) foot apart from a first measurement gradation 32a of the plurality of measurement gradations 32 of the ridge 22a.

In another example, at least one T-shaped bead 38 (FIGS. 2 and 4b) located on the floor panel 20 (i.e., integral with the floor panel 20) opposite an end of the tailgate 18 is used as a starting point for measuring cargo located along the ridge 22 in the cargo compartment 24. The bead 38 extends upwardly from the floor panel 20 and is positioned a predetermined distance from a first measurement gradation 32b of the plurality of measurement gradations 32 of a respective ridge 22. It should be understood that in some forms the bead 38 may be L-shaped or any other suitable shape for acting as a starting point for measuring cargo located along a respective ridge 22 in the cargo compartment 24. In other examples, an inner surface of a vertical wall (i.e., vertical wall located at an end of the cargo bed 14 opposite the tailgate 18) of the cargo bed 14 is used as a starting point for measuring cargo located along the ridge 22 in the cargo compartment 24.

In the example illustrated, the plurality of measurement gradations 32 are longitudinally aligned with each other and are grooves extending in a lateral direction relative to the ridge 22. In another example, the measurement gradations 32 may be apertures extending through and along the ridge 22, for example. In another form, the measurement gradations 32 may be ribs or bumps extending outwardly from the ridge 22, for example. Indicia 50 (FIG. 2) such as numbering or scales may also be located on the floor panel 20 of the cargo bed 14, for example, to further facilitate a user in measuring cargo along the respective ridge 22. Such indicia can be printed, stamped, or molded into the floor panel 20. In some forms, the indica 50 may be located on the ridges 22 of the cargo bed 14, instead of, or in addition to, the floor panel 20.

With reference to FIG. 5, a modular bed liner 114 is illustrated. The modular bed liner 114 may be incorporated into the cargo bed 14 of the vehicle 10 above. The modular bed liner 114 includes a plurality of side walls 116 (only one shown in the figure), a floor panel or bottom surface 120, and a plurality of ridges 122. A measurement grid 124 is formed on or in the floor panel 120 and is configured to measure an area of cargo located in the bed liner 114, for example. For example, the grid 124 allows the square footage of cargo such as carpet located in the bed liner 114 to be quickly and accurately measured without the need for additional measuring devices. The grid 124 includes grid line 128 that are spaced predetermined increments from each other. In the example illustrated, the grid lines 128 are spaced one (1)foot, or twelve (12) inches, apart from each other. In this way, the grid 124 may also be used to measure cargo such as a plank (e.g., 2×4), for example, oriented laterally or longitudinal in the bed liner 114 without the need for additional measuring devices. Indicia such as numbering or scales may also be associated with the grid 124, for example, to further facilitate a user in measuring cargo in the bed liner 114.

With reference to FIGS. 6 and 7, cargo components 214a, 214b are illustrated. The cargo components 214a, 214b in this form are floor mats or bedliners. In one example, the cargo components 214a, 214b are located on a floor panel of a cargo bed. In another example, the cargo components 214a, 214b are located on the floor panel of an occupant cabin of a vehicle. In the example illustrated in FIG. 6, the cargo component 214a comprises a decorative structure 216 including a plurality of triangles that are configured to measure angles of objects located thereon. For example, the decorative structure 216 measures 30-degree angles, 45-degree angles, 60-degree angles, and/or 90-degree angles. In the example illustrated in FIG. 7, the cargo component 214b comprises measurement gradations 218 formed therein and aligned along a length of the cargo component 214b. In other examples, the measurement gradations 218 are formed in the cargo component 214b and aligned along a width of the cargo component 214b. In the example illustrated, the measurement gradations 218 are lines formed on the cargo component 214b. In other examples, the measurement gradations 218 may be ridges, grooves, or other markings formed in or on the cargo component 214b. Indicia such as numbering or scales, in some forms, is associated with the cargo components 214a, 214b, for example, to further facilitate a user in measuring cargo located thereon.

Unless otherwise expressly indicated herein, all numerical values indicating mechanical/thermal properties, compositional percentages, dimensions and/or tolerances, or other characteristics are to be understood as modified by the word "about"or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A cargo component of a vehicle comprising:
a panel spanning a majority of a cargo compartment of the cargo component, the panel also defining a bottom surface of the cargo compartment;
a pair of side walls extending upward from the panel;
at least one ridge extending along the panel and located between the pair of side walls; and
a plurality of measurement gradations formed in and along the at least one ridge, the measurement gradations are mechanically formed in the at least one ridge, each measurement gradation extending substantially an entire width of the at least one ridge.

2. The cargo component of claim 1, wherein the panel is a floor panel, and wherein the at least one ridge is integral with and extends above the floor panel.

3. The cargo component of claim 2, wherein the at least one ridge is configured to provide stiffness to the panel.

4. The cargo component of claim 1, wherein the at least one ridge extends in a longitudinal direction of the panel.

5. The cargo component of claim 1, wherein a measurement grid is formed on the panel.

6. The cargo component of claim 1, wherein the at least one ridge includes opposing sides, and wherein at least one of the opposing sides is straight.

7. The cargo component of claim 6, wherein the at least one ridge extends substantially a length of the panel.

8. The cargo component of claim 1, further comprising a bead formed in the panel and positioned a predetermined distance from a nearest measurement gradation of the plurality of measurement gradations, the bead configured to acts as an end point for measuring cargo located along the at least one ridge.

9. The cargo component of claim 8, wherein the bead is T-shaped.

10. The cargo component of claim 8, wherein the bead is configured to provide stiffness to the panel.

11. The cargo component of claim 1, further comprising a floor mat located on the panel, the floor mat comprising a decorative structure configured to measure angles of objects located thereon.

12. The cargo component of claim 1, wherein the measurement gradations are longitudinally aligned with each other.

13. A cargo component of a vehicle comprising:
a panel spanning a majority of a cargo compartment of the cargo component, the panel also defining a bottom surface of the cargo compartment;
a pair of side walls extending upward form the panel;
a plurality of longitudinal ridges extending along the panel and configured to provide stiffness to the panel, the plurality of longitudinal ridges located between the pair of side walls; and
a plurality of measurement gradations formed in and along each ridge of the plurality of longitudinal ridges, the measurement gradations are mechanically formed in each ridge, each measurement gradation extending along a width of the ridge.

14. The cargo component of claim 13, wherein the panel is a floor panel, and wherein each longitudinal ridge is integral with and extends above the floor panel.

15. The cargo component of claim 13, wherein the longitudinal ridges include opposing sides, and wherein at least one of the opposing sides is straight.

16. The cargo component of claim 13, wherein at least one of the plurality of longitudinal ridges extends substantially a length of the panel.

17. The cargo component of claim 13, wherein the plurality of longitudinal ridges are laterally spaced apart from each other.

18. A cargo component of a vehicle comprising:
a floor panel;
at least one longitudinal ridge extending along the floor panel and configured to provide stiffness to the floor panel, the at least one longitudinal ridge is integral with and extends above the floor panel;
a plurality of measurement gradations formed in and along the at least one longitudinal ridge; and
a bead formed in the floor panel and positioned a predetermined distance from a nearest measurement gradation of the plurality of measurement gradations of the at least one longitudinal ridge, the bead configured to acts as an end point for measuring cargo located along the at least one longitudinal ridge.

* * * * *